United States Patent [19]
Takahashi

[11] Patent Number: 4,729,707
[45] Date of Patent: Mar. 8, 1988

[54] DOUBLE END STUD

[75] Inventor: Yoshiki Takahashi, Akashi, Japan

[73] Assignee: Kawasaki Jukogyo Kabushiki Kaisha, Kobe, Japan

[21] Appl. No.: 813,474

[22] Filed: Dec. 26, 1985

[30] Foreign Application Priority Data

Dec. 27, 1984 [JP] Japan .................. 59-281231

[51] Int. Cl.⁴ .............................................. F16B 35/00
[52] U.S. Cl. .................................. 411/389; 411/386; 403/45
[58] Field of Search ............... 411/386, 389, 396, 383, 411/384; 403/43, 47, 44–46, 48

[56] References Cited

U.S. PATENT DOCUMENTS

| 389,028 | 9/1888 | Wallace | 411/389 |
|---|---|---|---|
| 838,448 | 12/1906 | Pitcher | 403/43 |
| 1,018,490 | 2/1912 | Hall | 411/389 |
| 1,335,613 | 3/1920 | Selle . | |
| 3,943,818 | 3/1976 | Pryor et al. . | |
| 4,457,117 | 7/1984 | Leiher et al. | 403/45 |

FOREIGN PATENT DOCUMENTS

| 821883 | 11/1951 | Fed. Rep. of Germany | 411/389 |
|---|---|---|---|
| 2045295 | 3/1972 | Fed. Rep. of Germany | 403/44 |
| 2526701 | 12/1976 | Fed. Rep. of Germany . | |
| 1580325 | 5/1969 | France . | |
| 2439321 | 10/1978 | France . | |
| WO83/00365 | 2/1983 | World Int. Prop. O. . | |
| 21680 | of 1897 | United Kingdom | 411/389 |

Primary Examiner—Neill Wilson
Attorney, Agent, or Firm—Leydig, Voit & Mayer

[57] ABSTRACT

A double end stud has a shank member including a central slide shank portion and threaded portions formed coaxially on both axial ends of the slide shank portion. The threaded portions are externally threaded in opposite directions. The double end stud also has a nut member carried by the slide shank portion of the shank member slidably in the axial direction but not rotatably with respect to the slide shank portion. In use, the nut portion is moved axially as the threaded portions are screwed into female thread portions of the two structural members to be connected, so that the depth of penetration of the double end stud into both structural members are optimized to ensure a high strength of connection between these structural members.

23 Claims, 19 Drawing Figures

DOUBLE END STUD

BACKGROUND OF THE INVENTION

The present invention relates to a double end stud which is used in connecting two structural members to each other.

Drawbacks of conventional double end studs will be explained with specific reference to FIGS. 16 through 19. As will be seen from these Figures, a conventional double end stud has a nut 1 and externally threaded portions 2 integrally formed on both axial ends of the nut 1. Two portions 2 are threaded in opposite directions: namely, one has a clockwise screw thread, while the other has counter-clockwise screw thread. In use, the double end stud is placed between the opposing surfaces of two structural members A and B which are to be connected together, as shown in FIG. 17. As the nut 1 is rotated by a suitable tool, the threaded portions 2 are screwed into female screw members 3, 3 provided on the structural members A and B, so that the structural members A and B are pulled and connected together in a manner shown in FIG. 16.

For the purpose of firmly connecting two structural members A and B together, it is essential that the tightening margins of both threaded portions 2, 2 be determined to meet certain requirements with respect to the structural members. More specifically, referring to FIG. 17, the tightening margins, which are the axial distances to be travelled by respective structural members as the threaded portions 2 are driven, are represented by LA and LB, respectively. The tightening margins LA and LB have to match with the thicknesses tA and tB of both structural members and the effective lengths $L_1$ and $L_2$ of both threaded portion 2. For instance, when both threaded portions have an equal effective length, i.e., when the condition of $L_1=L_2$ is met, it is necessary that the condition of LA +tA =LB +tB is met. If there is any difference between the thicknesses tA and tB, the connecting force is reduced by an amount corresponding to the difference in the thickness.

For strongly connecting both structural members by the double end stud, it is also necessary that the rotational phases of starting ends of the threads on both threaded portions 2 coincide with the starting ends of corresponding female screw threads on the structural members A and B.

FIG. 18 shows an example in which female screw members 3A and 3B on both structural members A and B have opposing surfaces which are to be contacted by adjacent axial end surfaces of the nut 1. In this case, it is necessary that the effective lengths $L_1$ and $L_z$ of both threaded portions match with each other.

FIG. 19 shows another example in which one A of the two structural members is thin and backed up by a flat washer 4. In this case, one of the threaded shanks has to extend over a large thickness tA'. Since this thickness tA' is determined by the thicknesses of a plurality of members, error in the thickness size tends to occur with regard to the structural member A. Moreover, the effective lengths $L_1$ and $L_2$ of the threaded shanks 2 have to strictly match with the tightening margins $L_A'$, $L_B$ in consideration of the difference between the thicknesses tA' and tB. Actually, however, it is almost impossible to meet such requirement.

For these reasons, conventional double end studs often fail to provide the desired strength of connection between two structural members.

SUMMARY OF THE INVENTION

Accordingly, an object of the invention is to provide a double end stud which is capable of firmly connecting two structural members.

To this end, according to the invention, there is provided a double end stud comprising: a shank member having a central slide shank portion and threaded portions formed coaxially on both axial ends of the slide shank portion, the threaded portions being externally threaded in opposite directions; and a nut member carried by the slide shank portion of the shank member slidably in the axial direction but not rotatably with respect to the slide shank portion.

The invention will be fully understood from the following description of the prior art when the same is read in conjunction with the accompanying drawings.

BRIEF DESCRIPTION CF THE DRAWINGS

Figure 10:
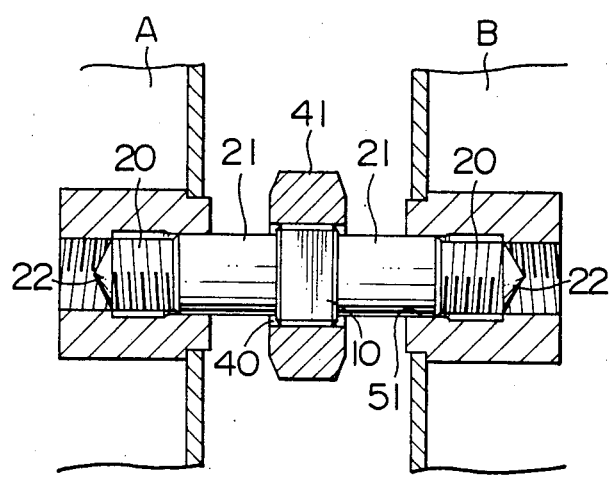
Figure 11:
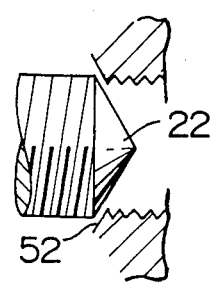
Figure 12:
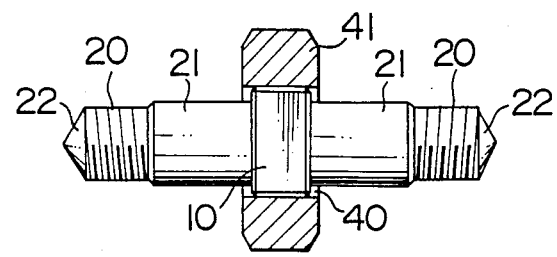
Figure 13:
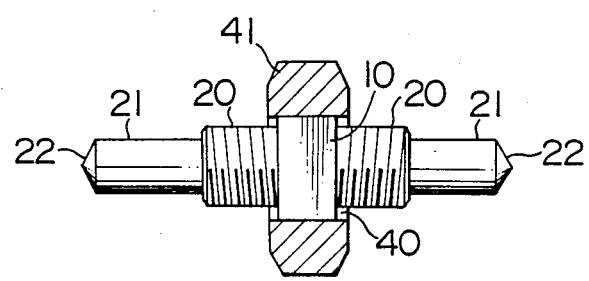
Figure 14:
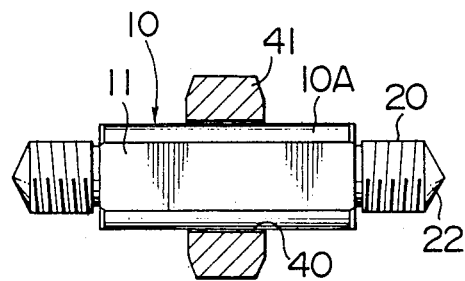
Figure 15:
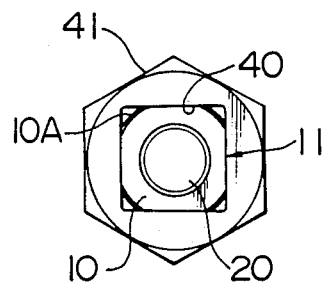
Figure 16:
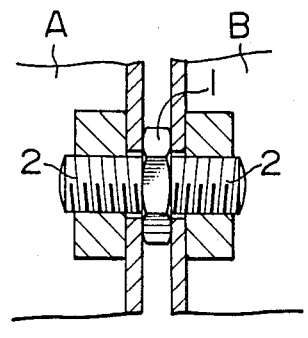
Figure 17:
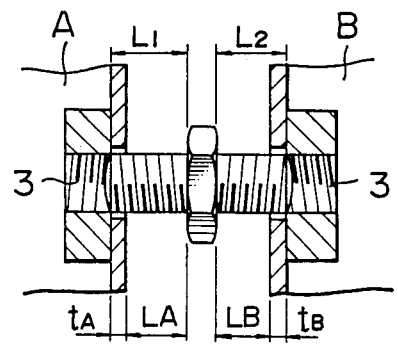
Figure 18:
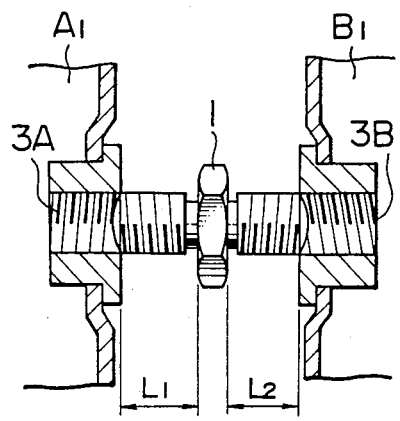
Figure 19:
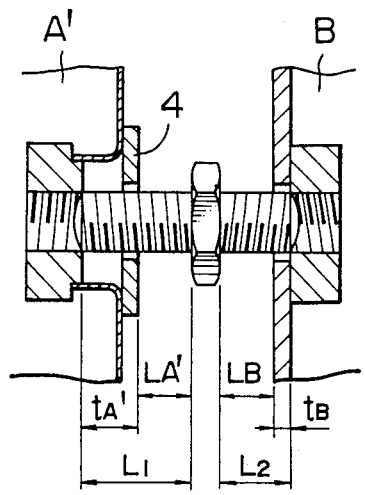

FIG. 10 a vertical sectional view of a third embodiment of the invention;

FIG. 11 is an enlarged sectional view of a portion of the third embodiment shown in FIG. 11;

FIG. 12 is a partly-sectioned elevational view of a fourth embodiment of the invention;

FIG. 13 is a partly-sectioned elevational view of a fifth embodiment of the invention;

FIG. 14 is a partly-sectioned elevational view of a sixth embodiment;

FIG. 15 is an end view of the sixth embodiment; and

FIGS. 16 to 19 are illustrations of examples of connection between two structural members by conventional double end studs.

DESCRIPTION OF THE PREFERRED EMBODIMENTS

Figure 1:
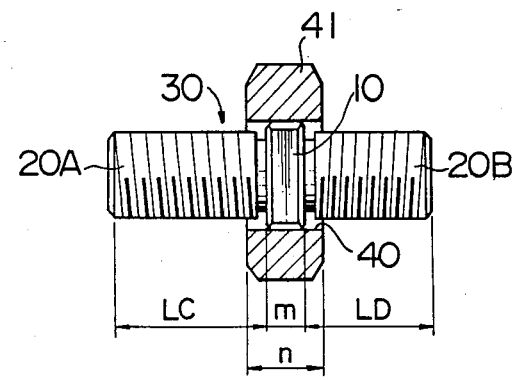
FIG. 1 is a sectional view of a first embodiment of the double end stud in accordance with the present invention.
Figure 2:
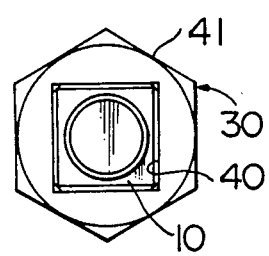
FIG. 2 is an end view of the embodiment shown in FIG. 1.

Referring to FIGS. 1 and 2 showing a first embodiment of the double end stud in accordance with the invention, the double end stud generally designated by a numeral 30 has a central slide shank portion 10 of a substantially square cross-section and threaded portions 20A and 20B formed coaxially and integrally on both axial ends of said slide shank portion 10 and threaded in opposite directions. The double end stud 30 further has a nut member 41 having a slide bore 40 having a square cross-section matching with the slide shank portion 10. Thus, the nut member 41 fits at its slide bore 40 on the slide shank portion 10 of the double end stud 30, so that it is slidable in the axial direction but is prevented from rotating with respect to the slide shank portion 10. In this embodiment, the slide shank portion 10 has an axial length m which is smaller than the axial length n of the slide bore 40 in the nut member 41, so that the difference (n−m) provides a tolerance for any difference between the tightening margins of both threaded shank portions.

Although in this embodiment the lengths LC and LD of both threaded portions 20A and 20B are determined to meet the conditions of LC>LD, this is not exclusive and the lengths may be selected to meet the condition of LC =LD or other conditions, depending on the thicknesses of the structural members to be connected.

Figure 3:
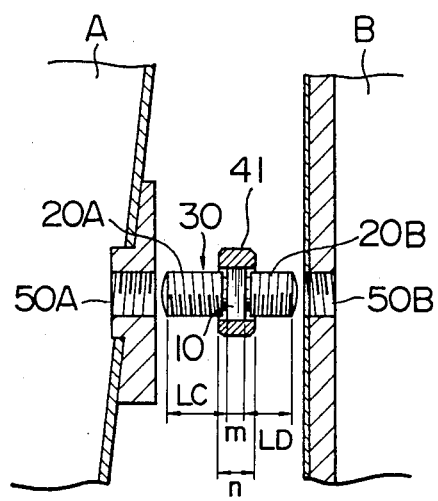
FIG. 3 is an illustration of two structural members which are to be connected by the first embodiment of the double end stud.
Figure 4:
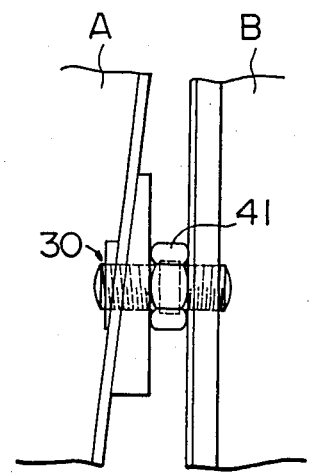
FIG. 4 shows the structural members shown in FIG. 3 in the state after the connection.

Using the double end stud 30 shown in FIGS. 1 and 2, two structural members A and B are connected to each other in a manner which will be explained hereinunder with reference to FIGS. 3 and 4.

The structural members A and B are provided with female threaded portions 50A and 50B which are internally threaded in opposite directions in conformity with the external threads on the threaded portions 20A and 20B of the double end stud 30. The double end stud 30 is placed between two structural members A and B in axial alignment with the female threads on these structural members. Then, two structural members are brought together such that the female thread portions 50A and 50B are contacted by the ends of the corresponding threaded portions 20A, 20B. As the nut member 41 is rotated, the double end stud 30 as a whole is rotated because the nut member 41 is not allowed to rotate with respect to the slide shank portion 10, so that the threaded portions 20A and 20B are driven into the structural members A and B through screwing engagement with the female thread portions 50A and 50B of these structural members. Since the nut member 41 is allowed to slide axially on the slide shank portion 10, so that, when the nut member 41 is contacted by one of the structural members, e.g., the member B in the illustrated case, the nut member 41 is axially pushed to slide on the slide shank portion 10 towards the other structural member A, so that the nut 41 is finally contacted by both structural members, thus automatically attaining an equal tightening margin, whereby both structural members A and B are firmly connected through the double end stud in a manner shown in FIG. 4.

The foregoing description is based upon an assumption that the pitch of the male screw threads on both threaded portions 20A and 20B are equal. Needless to say, however, both threaded portions 20A and 20B can have different pitches of male threads, provided that the lengths LC and LD of these shank portions are suitably selected in relation to the pitches.

Figure 5:
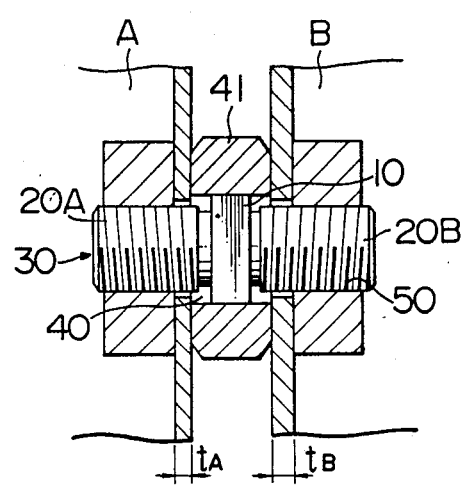
FIG. 5 shows other types of structural members connected by the double end stud of the first embodiment.

FIG. 5 shows another example of application in which the seat members of both structural members A and B have different thicknesses tA and tB.

Figure 6:
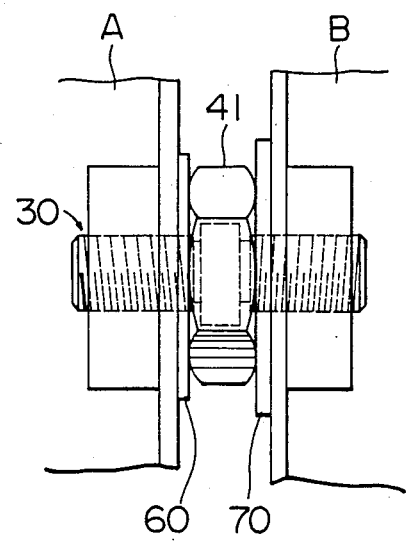
FIG. 6 shows different types of structural members connected by the double end stud of the first embodiment.

FIG. 6 shows still another example in which a washer 60 and another member 70 are clamped between the nut member 41 of the double end stud 30 and two structural members A and B connected by the double end stud 30.

Figure 7:
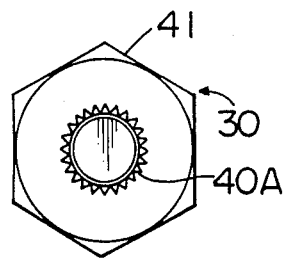
FIG. 7 is an end view of a modification of a slide shank portion of the double end stud of the first embodiment.

In the first embodiment described hereinbefore, the construction for mounting the nut member 41 on the slide shank portion 10 for free axial sliding movement but against relative rotation is realized by a square cross-section of the slide shank portion 10 and a mating square slide bore 40 formed in the nut member 41. This, however, is not exclusive and the same result is produced by any type of construction which permits the nut member 41 to slide axially but prevents the same from rotating with respect to the slide shank portion 10. For instance, this construction may be achieved by mating serrations formed on the outer peripheral surface of the slide shank portion 10 and the inner peripheral surface of the slide bore 40A, as shown in FIG. 7. Similarly, the illustrated outer configuration of the nut member 41 is not exclusive.

Figure 8:
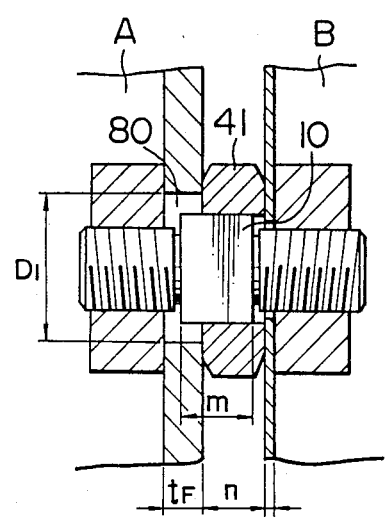
FIG. 8 is a vertical sectional front elevational view of a second embodiment.
Figure 9:
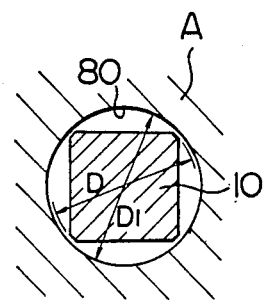
FIG. 9 is a cross-sectional view of the second embodiment.

FIGS. 8 and 9 show another embodiment. As will be seen from FIG. 8, one A of two structural members A and B to be connected has a clearance hole 80 of a size large enough to receive the slide shank portion 10 of the double end stud 30. In this case, the slide shank portion 10 has an axial length m which is greater than the axial thickness n of the nut member 41 but is smaller than the sum of the axial thickness n of the nut member 41 and the axial depth tF of the clearance hole 80: that is, the condition of n<m<n+tF is met.

Thus, the embodiment shown in FIGS. 8 and 9 is suited to use in the case where a clearance hole, e.g., the hole 80, having a diameter $D_1$ greater than the diameter D of the slide shank portion 10 is formed in either one A of two structural members to be connected.

As explained before, the connection of two structural members by the double end stud 30 requires first to center the female thread portions of both structural members A and B and the double end stud 30 and, while maintaining them coaxially, to slightly press the double end stud by both structural members A and B before and during rotation of the nut member for connecting the structural members together. In most cases, however, the operator is not capable of visually checking the axial alignment between the female threaded portions and the double end stud. In addition, the portions where the double end stud is to be placed is generally difficult to access, so that the operator cannot accurately check the state of alignment by his hand. This problem is serious particularly in the case where the structural members A and B to be connected are huge in size or when a plurality of double end studs are to be used.

This problem is overcome by a third embodiment of the invention which will be explained hereinunder with specific reference to FIGS. 10 and 11.

In this embodiment, the double end stud 30 is provided with guide shank portions 21 on both ends of the slide shank portion 10 and the threaded portions 20 are formed on the outer ends of the guide shank portions 21. The outer ends of the threaded portions 20 are tapered so as to facilitate the centering of the double end stud 30. On the other hand, each of the structural members A and B has a guide bore 51 for guiding engagement with the guide shank portion 21 and a conical guide surface 52 which is adapted to be contacted by the tapered end 22 of the corresponding threaded shank portion 20, as will be seen from FIG. 11 which is an enlarged view of the essential portion of this embodiment. In connecting two structural members A and B to each other, the tapered end surface 22 of one of the threaded portions 20 is placed in contact with the conical guide surface 52 of the adjacent structural member A and the other structural member B is pulled towards the structural member A, so that the conical guide surface 52 on the structural member B is brought into contact with the tapered end 22 of the adjacent threaded portion 20. As the structural member B is brought closer to the structural member A, both guide shank portions 21 of the double end stud 30 are inserted into the guide bores 51 of the corresponding structural members, so that the female thread portions of both structural members A, B and the double end stud 30 are automatically centered and placed coaxially with one another.

In this state, the nut member 41 is rotated while the structural member B is lightly pressed onto the double end stud 30, so that the threaded portions are rotated and driven into the female thread portions of the structural members A and B, thus firmly connecting these structural members.

FIG. 12 shows a fourth embodiment in which the threaded portion 20 has a diameter smaller than that of the guide shank portion 21, and is provided with a tapered end surface for the purpose of centering. The operation and effect of this embodiment are materially identical to those of the third embodiment.

FIG. 13 shows a fifth embodiment in which the double end stud 30 has threaded portions 20, 20 on both sides of the slide shank portion 10 and guide shank portions 21, 21 of a smaller diameter than the threaded portions 20, 20 are formed on the outer ends of the threaded portions 20, 20. The operation and effect of this embodiment are materially identical to those of the third and fourth embodiments.

FIGS. 14 and 15 show a sixth embodiment of the invention in which the slide shank portion serves also as a guide shank portion. Namely, in this sixth embodiment, the guide shank portion 10A has a length which is large enough to reach and enter the guide holes (see FIG. 10) formed in both structural members A and B, and flat surfaces 11 for holding the nut member 41 axially slidably but against relative rotation are formed over the entire length of the guide shank portion 10A. The double end stud 30 of this embodiment has threaded portions 20, 20 on both sides of the guide shank portion 10A and the outer ends of the threaded portions 20, 20 are tapered as at 22, 22 to facilitate the centering. The operation and effect produced by this sixth embodiment are materially identical to those of the third to fifth embodiments.

In the conventional double end stud, the nut portion is integrally fixed to the shank member and, hence, cannot move along the length of the shank member. Therefore, the conventional double end shank member often failed to provide sufficiently high connecting strength due to mismatching of the tightening margins with the thicknesses of the structural members. This problem, however, can be overcome by the double end stud of the invention in which the nut member is allowed to slide axially on the slide shank portion so as to automatically provides even depth of penetration of the double end stud into both structural members, thus ensuring a firm and rigid connection between these structural members.

It will be understood from the foregoing description that the double end stud of the invention offers a remarkable advantage which could never be achieved by the conventional double end stud.

Although the invention has been described through specific terms, it is to be noted here that the described embodiments are not exclusive and various changes and modifications may be imparted thereto without departing from the scope of the invention which is limited solely by the appended claims.

What is claimed is:

1. A double end stud for joining two structural members, each provided with guide bores, comprising a shank member having:
   a central slide shank portion;
   portions coaxially threaded in opposite directions on alternate sides of said central slide shank portion;
   a nut member on said central slide shank portion slidable in the axial direction but not rotatable about said central slide shank portion; and
   means adapted to align the stud with guide bores of structural members including guide shank portions formed on said shank portions.

2. A double end stud according to claim 1 wherein said central slide shank portion is provided with a substantially square cross-section.

3. A double end stud according to claim 2 wherein said nut member is provided with an internal slidable surface having a substantially square cross-section.

4. A double end stud according to claim 1 wherein said central slide shank portion is provided with serrations formed on the outer surface thereof.

5. A double end stud according to claim 4 wherein said nut member is provided with a slidable surface having serrations commensurate with those formed on the surface of said central slide shank portion.

6. A double end stud according to claim 1 wherein the axial length of said central slide shank portion is greater than the axial thickness of said nut member but is less than the sum of the axial thickness of said nut member and the axial depth of a clearance hole adapted to receive a threaded portion of said double end stud.

7. A double end stud according to claim 1 wherein said guide shank portion is provided with at least one tapered end surface.

8. A double end stud according to claim 7 wherein said tapered end surface has a conical configuration.

9. A double end stud according to claim 1 wherein said guide shank portions are provided between said central slide shank portion and each of said threaded portions.

10. A double end stud according to claim 1 wherein said guide shank portions project outwardly from the outer ends of said threaded portions.

11. A double end stud according to claim 9 wherein the diameters of said threaded portions are less than the diameters of the guide shank portions.

12. A double end stud according to claim 10 wherein the diameters of said guide shank portions are less than those of the threaded portions.

13. A double end stud according to claim 1 wherein said guide shank portions are provided between said central slide shank portion and each of said threaded portions and the sum of the axial lengths of said central slide portion and said guide shank portion exceeds the axial thickness of said nut member.

14. A double end stud according to claim 1 wherein said guide shank portion is provided on said slide shank portion.

15. A double end stud according to claim 14 wherein the axial thickness of said nut member is greater than the axial length of said central slide shank portion, and the axial length of said threaded portion is greater than the length of the associated guide bore of the structure measured from a surface of said structure to the beginning of a threaded portion of the bore.

16. A double end stud according to claim 14 wherein said central slide shank portion is provided with a substantially square cross-section.

17. A double end stud according to claim 11 wherein said guide shank portion is provided with at least one tapered end surface.

18. A double end stud according to claim 17 wherein said tapered end surface has a conical configuration.

19. A double end stud according to claim 12 wherein said guide shank portion is provided with at least one tapered end surface.

20. A double end stud accoding to claim 11 wherein said guide shank portion id provided on said slide shank portion.

21. A double end stud according to claim 20 wherein said central slide shank portion is provided with a substantially square cross-section.

22. A double end stud according to claim 21 wherein said nut member is provided with an internal slidable surface having a substantially square cross-section.

23. A double end stud according to claim 19 wherein said tapered end surface has a conical configuration.

* * * * *